United States Patent [19]

Kuenzig et al.

[11] 4,394,116

[45] Jul. 19, 1983

[54] MANDREL ADJUSTMENT SYSTEM IN A PLASTIC RESIN BLOW MOLDING MACHINE

[76] Inventors: Ernest O. Kuenzig, 32 Waverly St., Glen Head, N.Y. 11545; Frank L. Pennino, 10 Leanore Dr., Farmingdale, N.Y. 11735

[21] Appl. No.: 327,902

[22] Filed: Dec. 7, 1981
(Under 37 CFR 1.47)

[51] Int. Cl.³ .................. B29D 23/04; B29F 3/06
[52] U.S. Cl. .................. 425/192 R; 264/541; 425/381; 425/532; 425/454; 425/465; 425/466
[58] Field of Search ........... 425/532, 191, 192 R, 425/454, 466, 381, 465; 264/541

[56] References Cited

U.S. PATENT DOCUMENTS

| | | | |
|---|---|---|---|
| Re. 30,215 | 2/1980 | Kuenzig et al. | 425/525 |
| 2,150,659 | 3/1939 | Santo | 425/192 R |
| 2,702,942 | 3/1955 | Michaelis | 425/191 |
| 3,023,461 | 3/1962 | Sherman | 425/532 |
| 3,345,690 | 10/1967 | Hagen | 425/532 |
| 3,369,272 | 2/1968 | Martin, Jr. et al. | 425/532 |
| 3,386,132 | 6/1968 | Fischer | 425/192 R |
| 3,436,952 | 4/1969 | Hajikano | 425/191 |
| 3,470,582 | 10/1969 | Martin, Jr. | 425/532 |
| 3,579,731 | 5/1971 | Cooper | 425/191 |
| 4,234,299 | 11/1980 | Kuenzig et al. | 425/292 |

FOREIGN PATENT DOCUMENTS

| | | | |
|---|---|---|---|
| 373553 | 1/1964 | Switzerland | 425/191 |
| 436827 | 10/1935 | United Kingdom | 425/191 |
| 1004332 | 9/1965 | United Kingdom | 425/191 |

*Primary Examiner*—Jeffery R. Thurlow
*Attorney, Agent, or Firm*—Eliot S. Gerber

[57] ABSTRACT

A plastic resin blow molding machine to form bottles from a thermoplastic resin forms a tubular parison of plastic resin by extruding the molded plastic from the circular orifice formed between a vertically aligned mandrel and a forming die. The mandrel is vertically adjusted relative to the forming die by an adjustment nut having screw threads which mate with the screw threads of the mandrel. The adjustment nut is rotatably mounted on a plate and is fixed to a ratchet ring having evenly spaced indentations, the ratchet ring being turnable by a ratchet wrench having a spring-loaded pawl.

20 Claims, 4 Drawing Figures

MANDREL ADJUSTMENT SYSTEM IN A PLASTIC RESIN BLOW MOLDING MACHINE

BACKGROUND OF THE INVENTION

The present invention relates to plastic blow molding machines.

A widely used process to produce containers, such as bottles, from a thermoplastic resin, such as polyethylene, is "blow molding". In that process plastic resin, generally in the form of pellets, is placed in a hopper which leads to an extrusion screw. The screw, by pressure or heat and pressure, causes the solid pellets to flow into a viscous semi-fluid mass of thermoplastic resin. The semi-fluid resin is forced by pressure to flow around a mandrel and through an extrusion die orifice which shapes it into a thin-walled elongated tube called a "parison".

The parison, having just been forced from the extruder die orifice and while still hot, is positioned over a blow tube and within an opened two-part mold. The mold is closed and its sealing members seal the top and the bottom of the parison to form an air-tight unit. Air is blown into the parison through the blow tube, causing it to expand against the inner walls of the mold. The walls of the mold are cooled and the cold walls of the mold cool the parison and form it into a bottle. The air is then exhausted and the two mold halves are opened.

This type of blow molding machine is generally described in U.S. Pat. No. 3,369,272 entitled "Apparatus For Concurrently Blow Molding And Trimming Plastic Articles" and U.S. Pat. No. 3,470,582 entitled "Apparatus For Compacting And Trimming Necks In Blow Molded Containers" describes a somewhat similar machine. Both of these patents are assigned on their faces to Hoover Ball and Bearing Company. In U.S. Pat. No. 3,369,272 the mandrel is elongated and has a bore containing the blow pipe. The top of the mandrel is threaded and screwed into a ring which is a portion of the die assembly.

In some blow molding machines a "pre-finish" neck is formed by a shearing action in the mold. When the mold parts are closed, a sealing and shearing member is moved into a cylindrical hollow on the blow pin, leaving a gap filled by the resin parison, to form a seal using the parison. Then the blow pin (sealing neck member) attached to the blow pipe is moved axially upwards; and the rising blow pin shears the plastic resin of the neck by forcing it against the shearing and sealing member which remains level. The blow pipe is raised and lowered within the bore of the hollow mandrel by an air cylinder piston. This type of blow molding machine is described in U.S. Pat. No. Re. 30,215 entitled "Sealing and Shearing Member In A Plastic Resin Blow Molding Machine" and in U.S. Pat. No. 4,234,299 entitled "Blow Pin Construction In A Plastic Bottle Blow Molding Machine."

In a typical blow molding machine, when the extrusion screw at its forward point hits a limit switch, a compressed air blast of low air pressure (for example, 45 pounds) for 2/10 to 3/10 of a second is sent through the blow pin to slightly blow (expand) the parison before the mold is closed. The mold is then closed and sealed and a blast of high pressure air (for example, 80 pounds) is expelled through the blow pin to expand the parison to the interior mold wall to form the bottle. The formed bottle is cooled by the cold mold wall for 3 to 5 seconds. The blow pin is then automatically pulled upwardly, for example, for a travel of ½ inch, to shear the bottle neck and form the round hole of the pre-finish neck.

An example of a blow molding machine is the UNI-LOY TM Model 350R2 made by Hoover Ball and Bearing Company. That machine may be equipped with four, six, eight, ten or twelve heads (molds). When equipped with six heads to make milk and juice gallon containers (less than 65-gram gallon size) it may make 2400 or more containers an hour.

In one type of blow molding machine the mandrel may be vertically lowered or raised relative to its forming die by means of an adjustment nut. The mandrel adjustment nut is freely rotatable within a plate and has interior screw threads which mate with the exterior screw threads on the top portion of the mandrel. A series of evenly spaced indentations are formed on the exposed upper portion of the mandrel adjustment nut. These indentations are round in cross-section and permit the insertion of a tool having a rounded boss. An operator may apply rotational pressure to the mandrel adjustment nut, turning it relative to the plate, by using the tool. As the mandrel adjustment nut is rotated on the screw threads of the mandrel, the mandrel is vertically lowered or lifted, depending upon the direction of rotation.

However, since there are vertical spacer pillars which prevent a full turn of the tool, it must be frequently repositioned in different indentations of the adjustment nut, preventing rapid and easy adjustment of the mandrel. When foreign particles become lodged in the extrusion orifice and the mandrel should be rapidly lowered, the slow action of the adjustment nut may cause a prolonged disruption in production. It has also been suggested that the adjustment nut may be rotated by a gear system. However, since the gear system presents a large mechanical advantage, the operator may not be sensitive to the orifice size and may injure the mandrel or the forming die.

Objectives and Feature of the Invention

It is an objective of the present invention to provide an apparatus in a plastic resin blow molding machine for the vertical adjustment of the mandrel relative to the forming die to thereby adjust the extrusion die orifice which forms the parison, which apparatus may rapidly lower and raise the mandrel under operator manual control, in the event dirt or other foreign matter becomes lodged in the extrusion orifice.

It is a further objective of the present invention to provide such an adjustment apparatus which, under operator control, may provide the exact orifice gap that is desired, thereby setting the exact and desired thickness of the parison.

It is a further objective of the present invention to provide such an adjustment apparatus which lock the mandrel in the desired position and which will maintain the mandrel in that position despite the repeated vibrations and shocks from the operations of opening and closing the mold and the lifting and lowering of the blow pipe.

It is a further objective of the present invention to provide such an adjustment apparatus which is relatively simple to operate so that it may be operated by the blow molding machine tender, as well as by trained maintenance personnel, and permits the mandrel to be removed for cleaning.

It is a feature of the present invention to provide an apparatus, in a plastic resin blow molding machine, to adjust the vertical position of a vertically aligned mandrel relative to its forming die. The parison is formed by the circular gap (orifice) between the mandrel and the forming die. The mandrel has a cylindrical top shaft portion with external screw threads, the forming die is positioned within a die block, the top shaft portion extends above the die block, and vertical spacer means are positioned on the die block.

A horizontally aligned plate member is connected to the spacer means and has a central round orifice therethrough. A mandrel adjustment nut, having internal screw threads which mate with the screw threads of the top shaft portion of the mandrel, is rotatably positioned on the plate member. A ring ratchet means is connected to the adjustment nut and has a plurality of spaced ratchet means about its external side wall. Preferably the ring ratchet means is a ring member having vertically elongated indentations.

A ratchet wrench means has a pawl which fits the spaced ratchet means and an arm member to at least partially span and grip the ring ratchet means. Rotation of the ratchet wrench means, when it is positioned on the ratchet ring means, turns the ratchet ring means and the adjustment nut to lower or raise the mandrel relative to the forming die. Set means are used to selectively lock the adjustment nut against rotation relative to the plate member.

BRIEF DESCRIPTION OF THE DRAWINGS

Other objectives and features of the present invention will be apparent from the following detailed description of a preferred embodiment of the invention, presenting the inventor's best mode of practicing the invention, which should be taken in conjunction with the accompanying drawings. In the drawings.

DETAILED DESCRIPTION OF THE INVENTION

Figure 1:
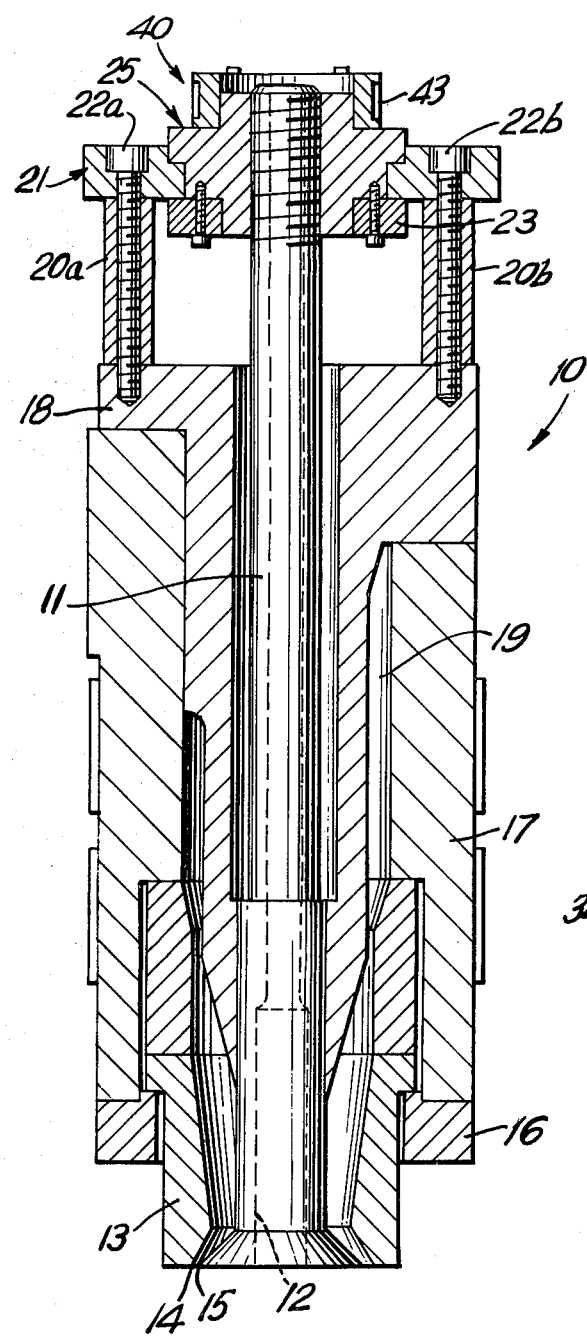
FIG. 1 is a side cross-sectional view of the die head assembly and a portion of the mandrel adjusting system of the present invention.

A portion of the blow molding machine is shown in FIG. 1, which illustrates the die assembly portion of the blow molding machine which extrudes the parison (tube) from heated and melted plastic resin. The drawing of the die assembly has been simplified for purposes of illustration; for example, it does not shown the heater associated with the die assembly.

As shown in FIG. 1, the die block 10 (die head) has, at its center, a mandrel 11 having a continuous bore 12 therethrough. The mandrel is a right-sided cylindrical elongated member which is ring-like in a horizontal cross-section. The mandrel 11 is aligned vertically within the die block 10. The forming die 13 is a ring-like member which forms a circular orifice (gap) 14 between an inner lower edge of the forming die 13 and the circular outer end 15 of the mandrel 11. The width of the orifice 14 determines the thickness of the parison. The mandrel 11 is adjustable so that it may be moved vertically relative to the forming die 13. Such vertical motion is required so that the orifice 14 may be adjusted as to size and may be cleaned of foreign particles.

The forming die 13 is held by fastening ring 16 to the die block bushing 17. The die bushing 17 is connected to the die insert 18. The ring 16, die bushing 17 and die insert 18 are generally cylindrical in shape and form the opening for the hot plastic resin. The plastic resin is injected under pressure into the gap 19 between the die bushing 17 and the die insert 18 from a supply passage (not shown) and is forced out under such pressure through the orifice 14, thereby forming the parison.

Two frame spacer members 20a, 20b, which are elongated sleeves, are positioned on top of the die block 10. The spacer members 20a, 20b are vertically aligned and support a horizontally aligned ring-like plate 21. The plate 21 is secured to the spacer members and the die block 10 by the bolts 22a and 22b.

A bottom ring 23 is fastened, by four bolts, to the bottom of a mandrel adjustment nut 25. The adjustment nut 25 is a round cylindrical member held within the central and aligned round orifices of the ring 23 and the plate 21. The mandrel adjustment nut 25 is freely rotatable within the plate 21 and has interior screw threads which mate with the exterior screw threads 26 on the top portion of the mandrel 11.

Figure 2:
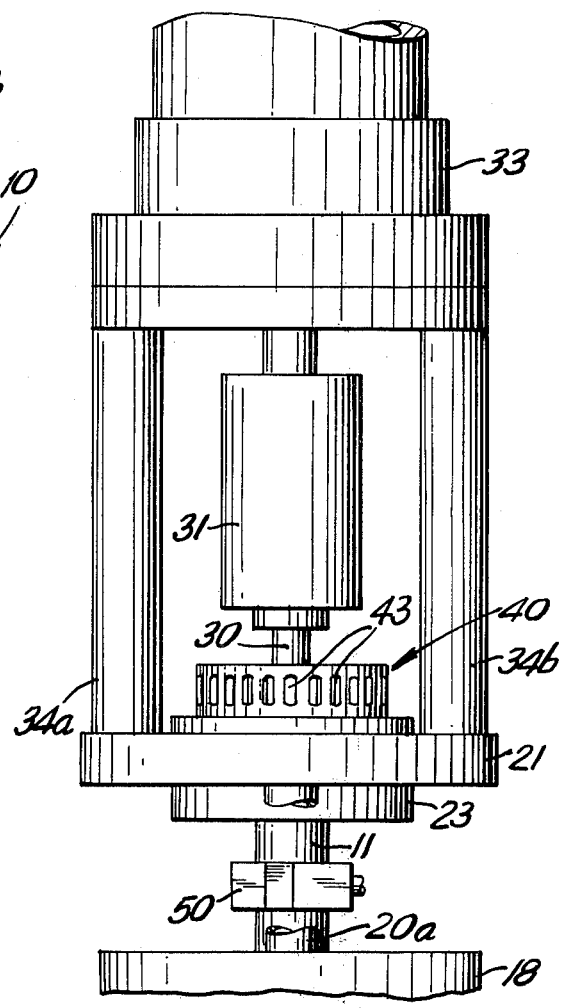
FIG. 2 is a side plan view of a portion of the adjusting system and its environment in the blow molding machine.

A hollow blow pipe 30 is within the entire length of the bore of the mandrel 11 and protrudes above the mandrel 11. As shown in FIG. 2, the blow pipe 30, which carries the bursts of compressed air, is coupled by a coupling 31 to the bottom end of the piston 32, a vertically operated piston of the air cylinder assembly 33, as in U.S. Pat. No. 3,369,722, mentioned above and incorporated herein. The air cylinder assembly 33 is spaced from the plate 21 by the vertically aligned spacers 34a, 34b. The upward movement of the air cylinder piston 32 will lift the blow pipe 30 and its attached blow pin, cutting off the unwanted top portion of the blown bottle formed from the parison.

Figure 3:
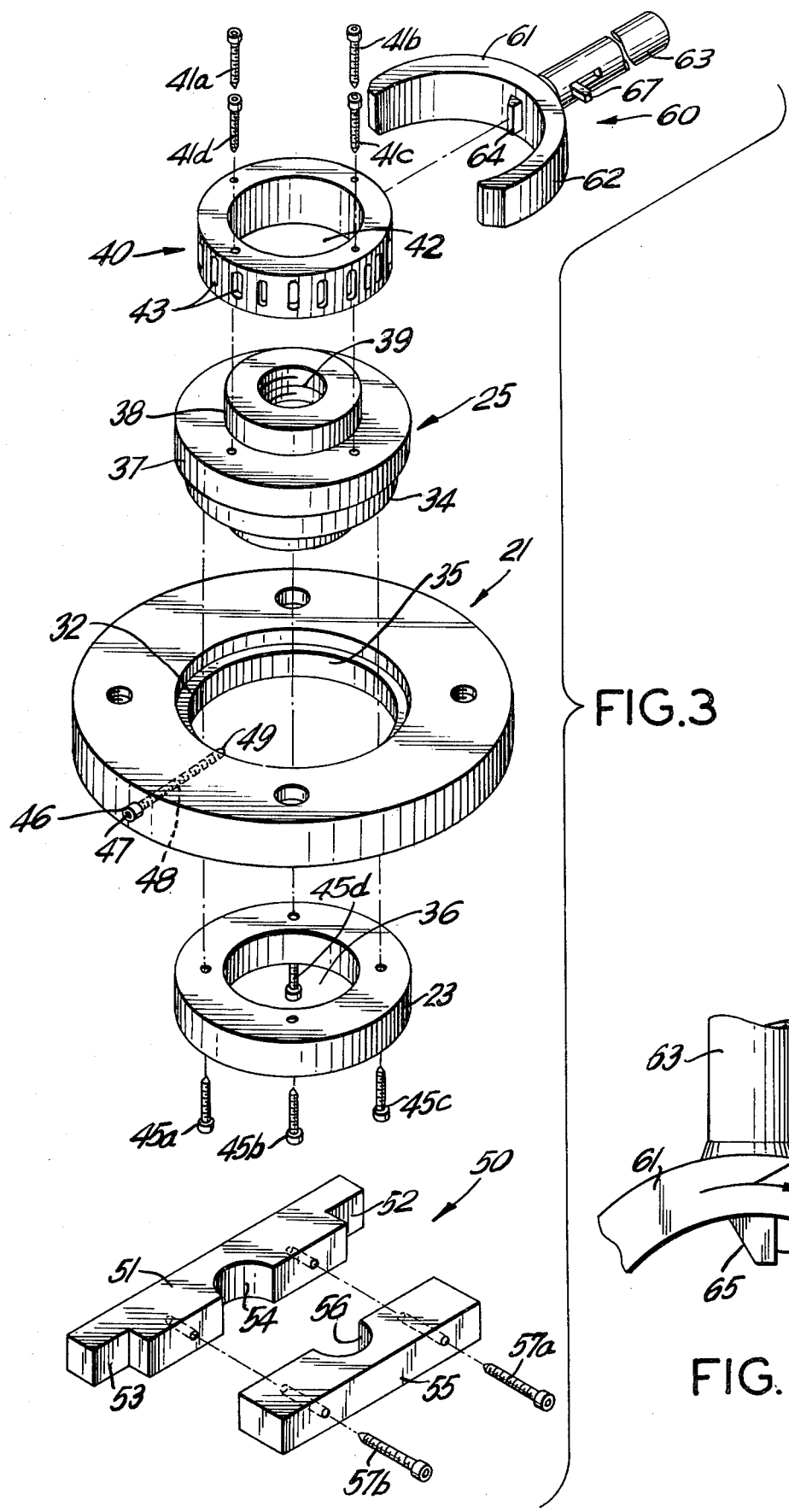
FIG. 3 is an expanded perspective view of the adjusting system.

The improvement of the present invention is shown in exploded view in FIG. 3. The plate 21 has a circular indentation 31 forming a circular ledge 32. The mandrel adjustment nut 25 has a bottom indented portion 34, ring-like in cross-section, which bottom portion 34 rotatably fits within the orifice 35 of the plate 21 and within the orifice 36 of the ring 23. The widened central portion 37 of the mandrel adjustment nut 25 has a flat bottom plateau which rotatably fits on the ledge 32 of the plate 21. A top narrow neck portion 38 of the mandrel adjustment nut is also ring-like in cross-section. The internal screw threads 39 of the adjustment nut 25, which continue the entire length of the bore of the nut, mate with the exterior screw threads of the top portion of the mandrel 11.

A ratchet ring means 40 is connected to the mandrel adjustment nut by means of bolts 41a through 41d. The inner diameter 42 of the ratchet ring 40 fits on the outer diameter of the neck porton 38 of the mandrel adjustment nut 25. The ratchet ring means 40 has a plurality of evenly spaced ratchet indentations 43 in its outer periphery. Each of the ratchet indentations (ratchet means), for example, there are twenty of them, is preferably an elongated indentation having rounded top and bottom edges and a flat bottom.

The bottom ring 23 is connected to the adjustment nut 25 by four bolts 45a through 45d so that the ring 23 turns with the adjustment nut 25, i.e., it is rotatable relative to the plate 21. The plate 21 includes a set screw 46 which may be manually operated to frictionally engage the exterior wall of the adjustment nut 25. The set screw 46 includes a head 47 projecting beyond plate 21, a shank 48 having screw threads which mate with screw threads of a horizontal bore through plate 21, and an inner end 49 which frictionally engages the adjustment nut 25.

The clamp 50 may be clamped to the mandrel 11, in the mandrel portion above the die block, to prevent the mandrel from turning while permitting its vertical movement. Without the clamp 50, if the adjustment nut 25 is turned it may, instead of vertically moving the mandrel, cause the mandrel to turn without vertical movement. In other words, the friction of the mating threads of the mandrel 11 and adjustment nut 25 may cause the mandrel to rotate along with the adjustment nut. The clamp 50 includes a left block member 51 having oppositely extending arms 52,53 and a semi-round indentation 54. A right block member 55, having a semi-round indentation 56, is joined to right block member 51 by bolts 57a, 57b after the respective indentations 54,56 are positioned to encircle the mandrel. The arms 52,53 slidingly bear against the respective spacer members 20a, 20b. The arms 52,53 prevent rotation of the clamp 50 and its attached mandrel 11, and yet permit their vertical movement.

Figure 4:
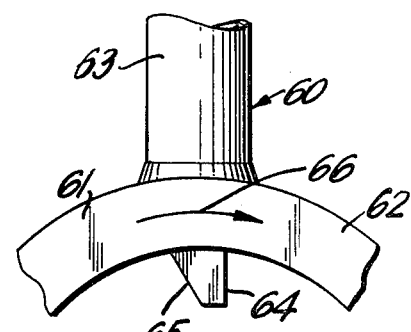
FIG. 4 is an enlarged top view of a portion of the ratchet wrench.

The ratchet wrench 60 is used to rotate the adjustment nut 25. It has two spanner arms 61,62 forming a "U" shape and an elongated handle 63. A spring (not shown) within the hollow handle 63 acts to bias (spring-load) a pawl 64. The arms 61,62 fit around the exterior side face of the ratchet ring 40 and the pawl protrudes into one of its indentations 43. The pawl has a straight side 64 (see FIG. 4) and an angled side 65, the straight side, on forward motion shown by the arrow 66, pushing upon a side wall of the indentations to rotate the adjustment nut 25 and the angled side 65 on back strokes of the wrench, camming the pawl into the handle against the spring bias. If desired, but not shown, the pawl may be reversible by having a slot so that it may be turned 180°, thereby reversing the directions of the straight and angled sides of the pawl, or wrench 60 may be turned over.

In operation, if a foreign particle becomes wedged in the extrusion orifice or the orifice size requires adjustment, the following procedure would be used. After shutting off the machine except for its heaters, the clamp 50 would be placed over the mandrel and tightened so that the mandrel would not rotate. The set screw 46 is loosened. Next, the ratchet wrench 60 would be placed over the ratchet ring 40. The operator would then turn the ratchet wrench 60 in the desired direction (clockwise or counter-clockwise) to lower or raise the mandrel. The back strokes of the ratchet wrench would return the wrench to its starting position without movement of the adjustment nut 25. The adjustment nut 25, and its connected bottom ring 23, rotate within the plate 21 and thereby lower or lift the mandrel. The ratchet wrench 60 is then taken off the ratchet ring 40 and the set screw 46 tightened so that its interior end is tight against the adjustment nut 25 to prevent rotation of that nut due to vibrations or other causes.

In the description above, the ratchet wrench 60 is used to turn the adjustment nut 25. In an alternative embodiment, not shown, in effect the two portions of the ratchet wrench may be separated. In this alternative embodiment the span arms 61,62 and the pawl 65 are made part of an outer ring which fits over the ratchet ring 40. The outer ring may be left on the ratchet ring 40 if it has two oppositely directed spring-loaded pawls only one of which is operated for each direction of rotation, or one reversible pawl, i.e., which may be turned 180°. The outer ring has a hole into which an arm is removably inserted in order to rotate the outer ring and thereby rotate the ratchet ring 40 and the adjustment nut 25.

What is claimed is:

1. An apparatus in a plastic resin blow molding machine to adjust the vertical position of a vertically aligned mandrel relative to a forming die, the mandrel and forming die forming a tubular parison, in which the mandrel has a cylindrical top shaft portion having external screw threads, the forming die is positioned within a die block, the mandrel top shaft portion extends above the die block, and vertical spacer means are positioned on the die block, the improvement comprising a horizontally aligned plate member connected to the spacer means and having an orifice therethrough, a mandrel adjustment nut having internal screw threads which mate with the screw threads of the top shaft portion of the mandrel, the adjustment nut being rotatably positioned on the plate member so that it freely rotates thereon, a ratchet ring means connected to the adjustment nut and having a plurality of spaced ratchet means about its external side wall so that its rotation will rotate the adjustment nut, and a ratchet wrench means positioned on the ratchet ring means to rotate said ratchet ring means and its connected thereto adjustment nut to lower and raise the mandrel relative to the forming die, said ratchet wrench means having a ratchet pawl which fits, in sequence, into the spaced ratchet means and an arm member to apply rotational pressure to said ratchet ring means through said pawl and to thereby rotate said adjustment nut; and set means to selectively lock said adjustment nut against rotation relative to the plate member.

2. Apparatus as in claim 1 wherein said ratchet wrench means includes a ring which fits over said ratchet ring means, said ring having ratchet pawl spring-loaded and protruding from its inner face during its rotation of the ratchet ring means.

3. Apparatus as in claim 1 and further including a support ring connected to the bottom of the adjustment nut and having an orifice aligned with the plate orifice, said ring encompassing the lower end of the adjustment nut and rotating with the adjustment nut relative to said plate.

4. Apparatus as in claim 1 wherein said plate member has a circular indentation centered on its orifice to thereby form a circular ledge and the adjustment nut has a circular undercut plateau which rotatably rests on said circular ledge.

5. Apparatus as in claim 1 wherein the said ratchet means are indentations in the outer wall of the ratchet ring.

6. Apparatus as in claim 1 wherein said ratchet ring means is a ring member removably connected to said adjustment nut by a plurality of bolts.

7. Apparatus as in claim 1 and further including, as the said set means, a rotatable set screw having a shaft, a head and an inner end, the shaft portion extending through said plate, the head extending outside of the plate, and the inner end selectively engageable with the adjustment nut.

8. Apparatus as in claim 1 wherein said ratchet wrench means includes a spring which loads the ratchet pawl.

9. Apparatus as in claim 8 wherein said arm member has extending spanner arms forming a "U" shape and said pawl is in the interior center of the "U" shape.

10. An apparatus in a plastic resin blow molding machine to adjust the vertical position of a vertically aligned mandrel relative to a forming die, the mandrel and forming die forming a tubular parison, in which the mandrel has a cylindrical top shaft portion having external screw threads, the forming die is positioned within a die block, the mandrel top shaft portion extends above the die block, and vertical spacer means are positioned on the die block, the improvement comprising a horizontally aligned plate member connected to the spacer means and having an orifice therethrough, a mandrel adjustment nut having internal screw threads which mate with the screw threads on the top shaft portion of the mandrel, the adjustment nut being rotatably positioned on the plate member so that it freely rotates thereon, a ring ratchet means about its external side wall so that its rotation will rotate the adjustment nut, and a ratchet wrench means removably positioned on the ratchet ring means to rotate said ratchet ring means and its connected thereto adjustment nut to lower and raise the mandrel relative to the forming die, said ratchet wrench means having a pawl which fits said spaced ratchet means and an arm member carrying said pawl and which at least partially spans and grips said ring ratchet means, and clamp means removably attachable to said mandrel and fixed against rotation relative to said spacer means to selectively lock said mandrel against rotation relative to the spacer means while permitting vertical movement of said mandrel.

11. Apparatus as in claim 10 wherein said clamp means comprises two opposite clamp members each having a semi-round indentation to enclose the mandrel and having sliding means to vertically slide on the vertical spacer means and prevent rotation of the mandrel.

12. Apparatus as in claim 10 and further including set screw means to selectively lock said adjustment nut against rotation relative to the plate member.

13. Apparatus as in claim 1 and further including a support ring connected to the bottom of the adjustment nut and having an orifice aligned with the plate orifice, said ring encompassing the lower end of the adjustment nut and rotating with said adjustment nut relative to said plate.

14. Apparatus as in claim 10 wherein said plate member has a circular indentation centered on its orifice to thereby form a circular ledge and the adjustment nut has a circular undercut plateau which rotatably rests on said circular ledge.

15. Apparatus as in claim 10 wherein the said ratchet means are indentations in the outer wall of the ratchet ring.

16. Apparatus as in claim 15 wherein said indentations are at least 20 in number and are vertically elongated and identical in shape.

17. Apparatus as in claim 10 wherein said ratchet ring is a ring member removably connected to said adjustment nut by a plurality of bolts.

18. Apparatus as in claim 12 and further including, as the set means, a rotatable set screw having a shaft, a head and an inner end, the shaft portion extending through said plate, the head extending outside of the plate, and the inner end selectively engageable with the adjustment nut.

19. Apparatus as in claim 10 wherein said ratchet wrench has a spring-loaded pawl which fits one of said spaced ratchet means and applies rotational pressure thereto.

20. Apparatus as in claim 19 wherein said ratchet wrench has two extending spanner arms forming a "U" shape and said pawl is in the interior center of the "U" shape.

* * * * *